June 16, 1959
F. M. ATKINSON
2,890,914
PULVERULENT MATERIAL CONVEYING APPARATUS
Filed June 8, 1956
2 Sheets-Sheet 1
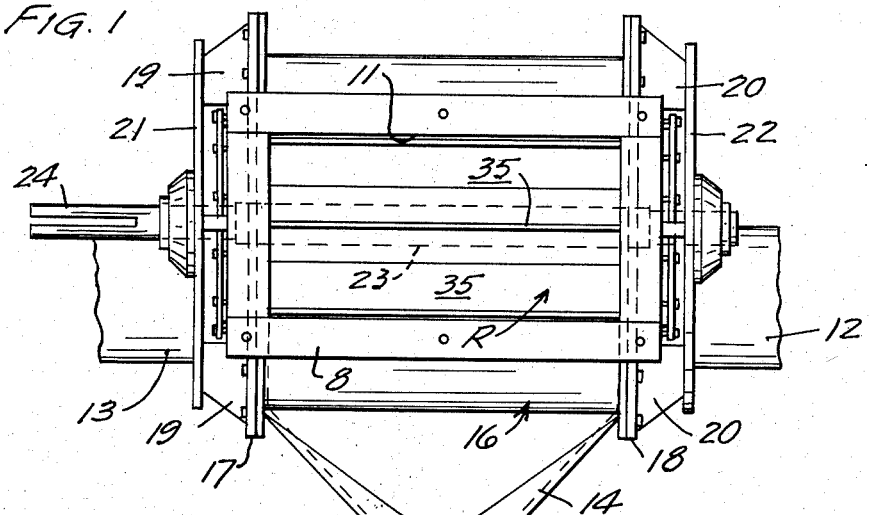
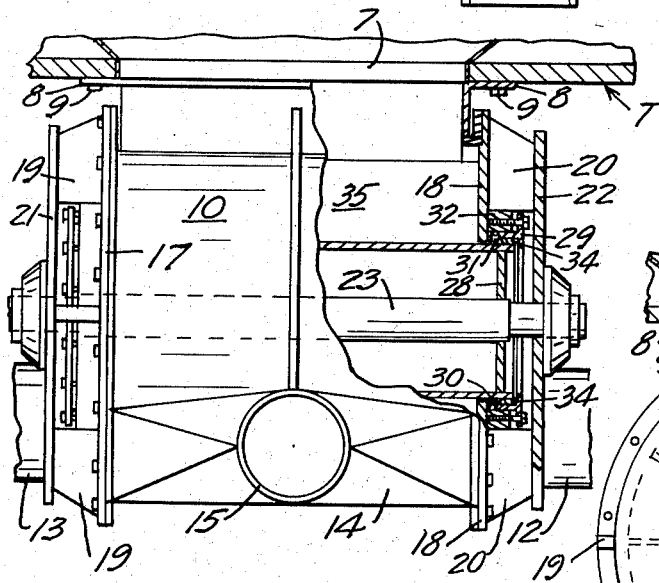
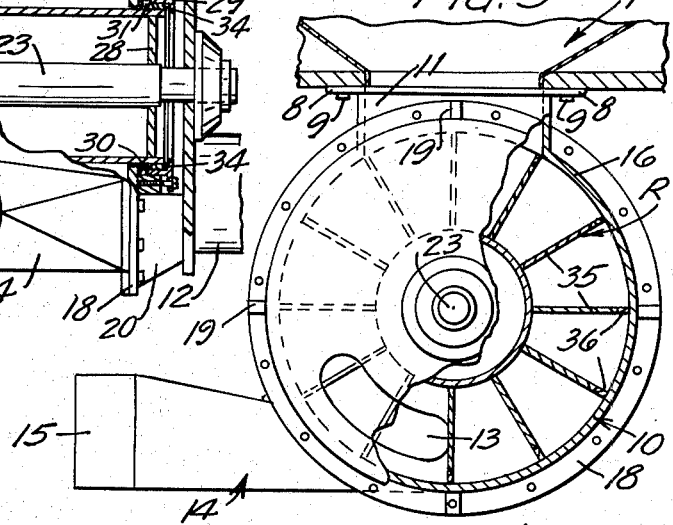
INVENTOR
FRED M. ATKINSON
BY
Williamson, Schroeder, Adams & Meyers
ATTORNEYS

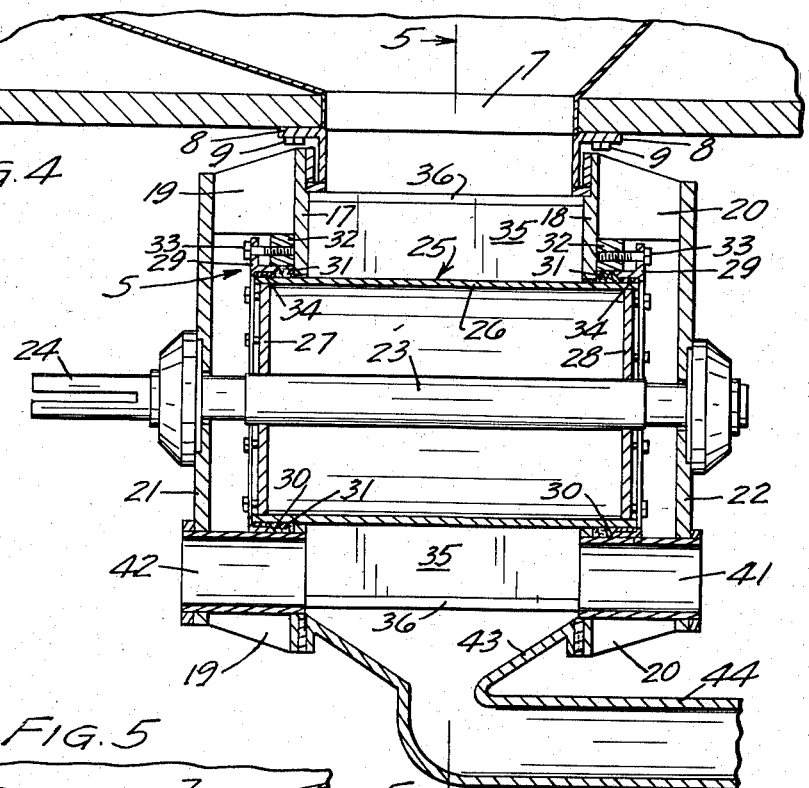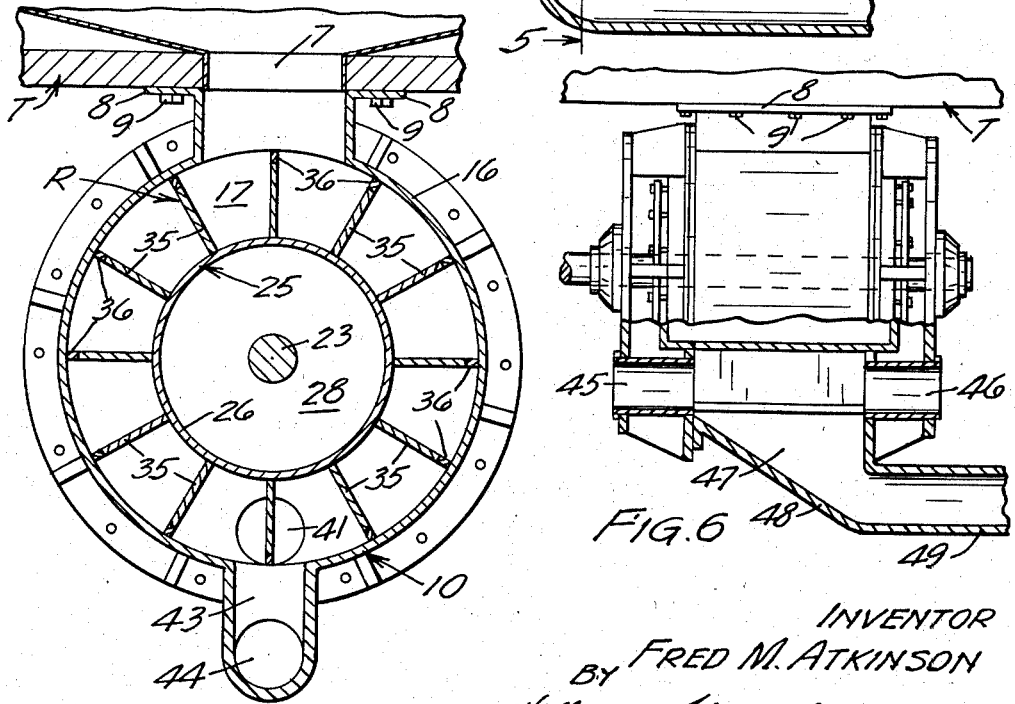

United States Patent Office 2,890,914
Patented June 16, 1959

2,890,914
PULVERULENT MATERIAL CONVEYING APPARATUS

Frederick M. Atkinson, Minneapolis, Minn., assignor to Atkinson Bulk Transport Company, Minneapolis, Minn., a corporation of Minnesota Application June 8, 1956, Serial No. 590,257

19 Claims. (Cl. 302—49)

This invention relates to apparatus for conveying pulverulent material. More particularly, it relates to apparatus for loading and unloading pulverulent material into and out of containers through the use of compressed air or similar gases intermingled with the material.

Pulverulent materials have been handled pneumatically for many years by entraining the fine particles of the material within a flow of large volumes of compressed air moving through a relatively large conduit at high speeds. More recently, as disclosed in my prior Patent No. 2,694,496, it has been discovered that pulverulent materials such as flour can be moved through smaller conduits in much heavier concentrations by fluidizing the material through the introduction of enough air to cause it to flow like water and subjecting the material to relatively high pressures such as 5 to 15 p.s.i. while in that fluidized state, whereby the material will be caused to flow through the conduit in a substantially solid flow at much slower speeds such as 300 to 2000 feet per minute and utilizing much less air. For example, in this latter method, only one pound of air is required for approximately 30 to 200 pounds pulverulent material whereas in strict pneumatic conveying, 1 to 3 pounds of air are required to move one pound of the pulverulent material. Regardless of which method of conveyance is used, whether it be strict pneumatic or conveyance by fluidization, the goal has always been to obtain higher concentrations of material so as to enable the user to convey a maximum amount of material within a minimum amount of time and with a minimum of power and apparatus. My invention is designed to convey higher concentrations than has heretofore been possible with previously known equipment.

Much of this equipment, in order to be of maximum use, must be mounted on the under side of trailers, railroad cars, and the like, and in such instances, the vertical space required for the equipment becomes of substantial importance. For example, in fluidized conveyance, it has been discovered that increased capacity can be attained if the discharge is radial instead of axial relative to a bladed rotor having compressed air blown into the space between adjacent blades to fluidize the pulverulent material and convey it in a substantially solid flow. However, such a discharge immediately increases the vertical space problem for the depth of the equipment is thereby increased and hence there is less clearance beneath the vehicle. My invention is designed to reduce this problem to a minimum.

It is a general object of my invention to provide a novel and improved apparatus for conveying pulverulent material, the apparatus being of simple and inexpensive construction and operation.

A more specific object is to provide a novel and improved apparatus for conveying pulverulent materials from one container to another at greater capacities than has heretofore been possible with previously known equipment.

Another object is to provide a novel and improved apparatus for conveying pulverulent materials which increases the clearance possible beneath a vehicle to which the apparatus is attached as compared to the most efficient apparatus heretofore known.

Another object is to provide a novel and improved apparatus for conveying pulverulent materials which provides a substantial increase in the capacity of the device without any substantial increase in construction or operation cost.

These and other objects and advantages of my invention will more fully appear from the following description made in connection with the accompanying drawings, wherein like reference characters refer to the same or similar parts throughout the several views, and in which:

Fig. 1 is a plan view of the preferred embodiment of my invention.

Fig. 2 is a side elevational view of the same.

Fig. 3 is an end elevational view of the same with portions thereof broken away to show the interior.

Fig. 4 is a vertical sectional view taken through a second embodiment of my invention.

Fig. 5 is a vertical sectional view taken along line 5—5 of Fig. 4.

Fig. 6 is a vertical sectional view on a reduced scale of a third embodiment of my invention.

Figs. 1–3 illustrate the preferred embodiment of my invention mounted beneath a trailer indicated generally as T which is adapted to carry a load of pulverulent material and has a material outlet 7 at the bottom thereof. Secured to the under side of the trailer T is a rotor indicated generally as R which is rotatably mounted and driven to engage the material as it descends through the opening 7 and to carry it away therefrom to a point where it may be fluidized and conveyed through a discharge conduit. The material may be brought from the interior of the trailer T to the opening 7 by a vibrator, a screw conveyor, or any other suitable means for providing an adequate supply of the material at all times to the rotor R.

The device includes attaching brackets 8 and bolts 9 which secure the rotor R to the trailer T. This rotor R includes a housing indicated generally as 10 which is generally cylindrical in shape and has a material inlet 11 at the upper portion thereof receiving the pulverulent material from the trailer T through its opening 7. This cylindrical housing 10 has a pair of oppositely disposed air inlets 12 and 13 which, as best shown in Fig. 3, are elongated and generally kidney-shaped. These compressed air inlets 12 and 13 are formed in the opposite end portions of the housing 10 and are disposed directly opposite each other relative to the rotor R. These air inlets 12 and 13 are adapted to be connected to a source of compressed air (not shown) which will furnish a pressure of 5 to 20 pounds per square inch, as desired. As shown, the housing is provided with a tangentially extending discharge 14 which converges outwardly from the housing 10 and extends horizontally from the lower point of the housing so that the flow out of the housing will move tangentially relative to the rotation of the rotor R. In use, the discharge conduit 15 is preferably a 5-inch conduit and pressures ranging from 7 to 9.5 p.s.i give very high concentrations although increased concentrations are also obtained even though pressures as low as 5 to 6 p.s.i. are utilized.

As best shown in Fig. 3, the housing 10 may include a metal tubular member 16, the axis of which is disposed horizontally and which has a pair of metal rings 17 and 18 secured to its ends and extending inwardly and radially therefrom. Welded to the metal rings 17 and 18 and extending outwardly therefrom is a plurality of support brackets such as 19 and 20 which, in turn, support a pair of supports or mounting plates 21 and 22. Rotatably journaled in the support or mounting plates 20 and 22 is a shaft 23 which extends through these plates and is adapted to be connected as at 24 to a variable speed driving mechanism (not shown).

Mounted within the housing 10 and upon the shaft 23 and secured for rotation therewith is a drum member 25. As best shown in Fig. 1, this drum member extends through the housing 10 and is comprised of a metal tube 26 and a pair of filler discs 27 and 28 which are mounted on the shaft and secured thereto to rotate with the shaft and carry the tubular member 26 with it. These filler discs 27 and 28 are welded or keyed to the shaft 23.

A sealing means indicated generally by the letter S is provided for preventing the escape of air outside the housing 10 at each of its ends. This sealing means is comprised of a metal ring 29 which is L-shaped cross-sectionally and sloped at its inner end as at 30. A plurality of packing rings 31 is provided to extend between the drum 25 and a tightening ring 32 which is welded to the support brackets 19 and 20 and to the metal rings 17 and 18. A bolt 33 extends through the metal ring 32 to tighten the same and compress the packing rings 31 to prevent the escape of air between the plate 18 and the tubular member 26. A bronze liner 34 is also provided to withstand friction. The sealing means S is provided at each of the ends of the housing so as to preclude the escape of air at each end.

As best shown in Fig. 3, the air inlets 12 and 13 are elongated and generally kidney-shaped. The inlets are shaped in this manner so as to introduce the compressed air from its source across a wider arc relative to the drum 25 than would otherwise be the case if the inlet were shaped circularly. It will be noted by reference to Fig. 3 that the inlets 12 and 13 are each positioned so as to lie outside the circumferential surface of the drum 25 and within the housing 10 so that the compressed air will be driven between this drum and the interior surface of the housing. The air inlets 12 and 13 and the radial discharge 14 are positioned in the same radial plane relative to the drum 25 so that they each communicate with the other and so that the flow of compressed air will tend to pass directly through the housing 10 along the lower portion thereof and longitudinally thereof and discharge tangentially through the discharge 14. In other words, the compressed air rushes inwardly axially of the drum 25 and then is diverted tangentially outwardly to carry the pulverulent material with it after having fluidized the same.

Mounted on the circumferential surface of the drum 25 and extending outwardly and radially therefrom is a plurality of blade members 35 which extend between the circumferential surface of the drum to a position in close proximity to the interior surface of the housing 10, the clearances being in the nature of .002 inch. These blade members 35 extend longitudinally of the drum so that, as they rotate with the drum, they will engage the pulverulent material descending through the opening 7 and carry the material around to a position directly in front of the air inlets 12 and 13 where it will be fluidized by the flow of compressed air and actuated so as to be conveyed by the compressed air outwardly through the tangential discharge outlet 14 in a substantially solid stream. These blades 35 extend in such close proximity to the interior surface of the housing 10 that very little, if any, air escapes therebetween. Each blade is provided with a brass tip 36. The sealing means previously described prevents any appreciable escape of air laterally between the end portions of the blade members 35. It will be noted that the adjacent blades 35 form conveying compartments with the interior surface of the housing 10 to transport or convey the pulverulent material around the shaft 23 to a position opposite the air inlets 12 and 13 and the tangential discharge 14.

Reference to Fig. 3 will show that the air inlets 12 and 13 are positioned so that, as the blades 35 rotate, each blade will pass beyond the adjacent end of the air inlets just prior to leaving contact with the interior surface of the housing 10 at the bottom of its arc of rotation. It will also be noted that the blades 35 again contact the inner surface of the housing 10 after passing by the discharge outlet 14 immediately after having passed the opposite end of the elongated air inlets 12 and 13. It will also be noted that the air inlets 12 and 13 are sufficiently long so that they communicate with more than one compartment at all times.

Figs. 4 and 5 show a second embodiment of my invention. The rotor and the housing and the trailer structure are substantially identical with that shown in Figs. 1–3 and therefore, for the sake of simplicity and description, identical numerals have been utilized for the same parts in these figures. The structure differs, however, in the manner in which the material is discharged from the housing 10. It will be noted that a pair of oppositely disposed air inlets 41 and 42 are utilized to introduce compressed air simultaneously at opposite ends of the housing 10 and between the adjacent blades 35. The lower portion of the housing 10 is provided with a radially outwardly extending discharge structure 43 which discharges the pulverulent material radially outwardly and then carries it laterally as shown by the conduit 44. It is recognized that others have previously increased the capacity of such a rotor by utilizing a radial discharge but none, to my knowledge, have ever utilized a radial discharge in combination with a pair of oppositely disposed air inlets. I have found that I can substantially increase the capacity of such a device by utilizing a pair of oppositely disposed air inlets.

Fig. 6 shows a third embodiment of my invention. The corresponding parts have been provided with identical numerals as in Figs. 1–5. The structure differs, however, through the utilization of a combined radial and axial discharge. The structure includes a pair of oppositely positioned compressed air inlets 45 and 46 which introduce compressed air simultaneously between each pair of adjacent blades 35 as they rotate and communicate simultaneously with the discharge outlet 47 provided by the discharge structure 48. It will be noted that this latter structure permits the pulverulent material to be discharged radially outwardly and also axially of the rotor R so as to provide a lateral discharge as shown by the conduit 49.

It will be noted that, in each of the embodiments shown in Figs. 1–6, I have utilized two air inlets positioned oppositely so as to enter the compartments from opposite ends thereof as defined by the blades 35 to fluidize the pulverulent material such as flour quickly and more efficiently and discharge it through the discharge outlet provided for that purpose. My apparatus differs in this respect from other devices which have been used for the same purpose heretofore, wherein a single air inlet and a single discharge outlet are utilized together to accomplish the fluidization and discharge of the pulverulent material. It will be noted that the material and air have a shorter distance to travel when injected at opposite end portions of the rotor and that a more efficient fluidization is attained because of better mixing of the compressed air with the pulverulent material.

In each of the embodiments shown, the compressed air is introduced from opposite points and the discharge outlet is positioned at a point intermediate the compressed air inlet. I have found that, through the use of such a device, a substantial increase in capacity can be attained. In other words, the number of pounds of flour which can be moved outwardly through the discharge outlet per minute is substantially increased. For example, tests performed on a device constructed in accordance with that shown in Figs. 4–5 with only a single air inlet at one end thereof, show that substantially less pulverulent material can be moved as compared to when two compressed inlets are utilized from opposite points, despite the fact that higher pressures are utilized with the single air inlet. When I tested a structure such as shown in Figs. 4–5 with a single air inlet instead of a double air inlet, as disclosed and claimed herein, and utilizing a 4-inch discharge conduit and one 6 x 5 Sutorbilt blower and one 8HXB Sutorbilt blower together, the maximum capacity attained was 950–975 pounds of pulverulent material per minute. These blowers provided 11 to 12 p.s.i. of pressure. On the other hand, when I utilized the structure shown in Figs. 4–5 with the same blowers and utilized a 4-inch pipe diameter, I reached a maximum capacity of 1,223 pounds per minute, an increase of approximately 250 to 275 pounds of pulverulent material per minute. Thus it can be seen that, through the use of a double air inlet positioned at opposite ends of the rotor, a very substantial increase in maximum capacity is attained.

Similarly, when I utilized a construction such as is shown in Fig. 6 with a single air inlet and a 4-inch diameter discharging conduit and one 6 x 5 Sutorbilt blower which provided 7 to 8 pounds per square inch pressure, I found that I was able to move approximately 950–975 pounds of flour per minute. When I used the same type of structure with two compressed air inlets, as shown in Fig. 6, I found that I could attain maximum capacities as high as 1,225 pounds of flour per minute. Here again, a very substantial increase in maximum capacity was attained.

Comparable results were obtained when the structure shown in Figs. 1–3 were tested first with a single air inlet and later with the double air inlets at opposite ends of the rotor as shown in these figures. When this device was tested with a single air inlet connected to a 6 x 5 Sutorbilt blower and utilizing a discharging conduit having a 5-inch diameter and 8.5 p.s.i., I have found that we could only move 1075 pounds of flour per minute. However, when we used the same blower and used the same pressures with double compressed air inlets, as is shown in Figs. 1–3, I found that I could move flour at a maximum capacity of 1300 pounds per minute. Here again, a very substantial increase in the maximum capacity is shown as the result of the use of a pair of oppositely positioned compressed air inlets.

It will be appreciated, of course, that the air inlets need not be positioned exactly oppositely. Of course they must be radially aligned so as to communicate with each other and with the discharge outlet. It appears, however, that a maximum efficiency is attained by disposing these compressed air inlets at opposite ends of the rotor so that the compressed air moves axially of the rotor and discharges tangentially therefrom at a point between the two air inlets.

Thus, it can be seen that I have provided a novel and improved device for conveying pulverulent material which has a maximum capacity substantially greater than any heretofore known and which can be constructed and operated without any substantial increase in cost. Because of the increase in capacity a substantial saving is effected for now, pulverulent material such as flour, can be moved more rapidly and more efficiently. In addition, through the use of the construction shown in Figs. 1–3, these advantages can be attained without sacrificing and, in fact, by saving clearance beneath the device which performs the conveying operation. With the structure shown in Figs. 1–3 an absolute minimum of depth is utilized and therefore maximum clearance is provided. As a result, there is less danger of the depending structure being damaged when a trailer or the like having the same mounted thereon passes over railroad tracks, grade crossings, etc.

It should be noted also that, regardless of whether the equipment disclosed and claimed herein in Figs. 1–6 are utilized to convey material by either fluidization or by pneumatic conveying, I have been able to attain substantial increases in maximum capacity of material conveyed. I have found that I can increase the maximum capacity at least 20% over maximum capacities heretofore attainable under a given set of conditions wherein only one air inlet is utilized.

It will, of course, be understood that various changes may be made in the form, details, arrangement and proportions of the various parts without departing from the scope of my invention.

What is claimed is:

1. Apparatus for use in the transportation of pulverulent materials, said apparatus comprising a substantially closed mixing chamber adapted to receive such pulverulent material therewithin and having at least a pair of spaced compressed-air inlets formed therein and directed toward each other, said air inlets being adapted to be connected to a source of air under pressure, and compartmentalized conveyor means moving within said chamber for introducing pulverulent material into said chamber and for movement of its compartments past said air inlets, said chamber having a material discharge outlet intermediate said air inlets, said air inlets and said material discharge outlet being arranged in communicating relation with each other, whereby the material received within said chamber will be discharged through said discharge outlet, the air being directed into said air inlets constituting the sole means for fluidizing and conveying the material through said discharge outlet.

2. Apparatus for use in the transportation of pulverulent materials, said apparatus comprising a substantially sealed mixing chamber having a pair of differently directed compressed-air inlets spaced from each other and disposed at opposite portions of said chamber, rotary conveyor means extending into said chamber and constructed and arranged to move pulverulent material into said chamber to said air inlets, said air inlets being adapted to be connected to a source of air under pressure, said chamber having a material discharge outlet disposed between said air inlets, said air inlets and said material discharge outlet being arranged to simultaneously communicate with each other, said chamber having a material-receiving inlet through which material may be introduced into the confines of said chamber into communication with said air inlets and said material discharge outlet, whereby the material within said chamber will be mixed with such compressed air and discharged through said discharge outlet, the air being directed into said air inlets constituting the sole means for fluidizing and conveying the material from said discharge outlet.

3. Apparatus for use in the transportation of pulverulent materials, said apparatus comprising a substantially sealed fluidizing chamber having a material-receiving inlet and having at least a pair of air inlets formed therein and spaced from each other, said air inlets being directed in different directions and adapted to be connected to a source of air under pressure, and compartmentalized conveyor means moving within said chamber for movement of its compartments past said material inlet to receive such material therefrom within its compartments and conveying the same way therefrom to a position between said air inlets and said discharge outlet, said chamber having a material discharge outlet communicating with said air inlets simultaneously, and means for repeatedly introducing material into the confines of said chamber and between said air inlets and said discharge outlet, whereby the material introduced into said chamber will be fluidized by such compressed air while the latter is moving from said air inlets to said material discharge outlet and discharged through said discharge outlet, the air being directed into said air inlets constituting the sole means for fluidizing and conveying the material from said discharge outlet.

4. Apparatus for use in the transportation of pulverulent materials, said apparatus comprising a housing having a material-receiving inlet, compartmentalized conveyor means moving within said housing for moving of its compartments past said material-receiving inlet to receive such material therefrom within its compartments and conveying the same away therefrom, said housing having at least a pair of compressed-air inlets formed therein and spaced from each other longitudinally of said conveyor means, said air inlets being oppositely directed and adapted to be connected to a source of air under pressure, said housing having a material discharge outlet, said air inlets and said material discharge outlet being arranged to simultaneously communicate with the individual compartments of said conveyor in succession as said conveyor moves along its path of conveyance, whereby the material conveyed within the compartments will be discharged through said discharge outlet while said inlets and said discharge outlet so communicate, the air being directed through said air inlets when so connected to a source of air pressure constituting the sole means for fluidizing and conveying the material from said discharge outlet.

5. Apparatus for use in the transportation of pulverulent materials, said apparatus comprising a housing having a material-receiving inlet, compartmentalized conveyor means mounted within said housing for movement of its compartments past said material-receiving inlet to receive such material therefrom within its compartments and convey the same away therefrom, said housing having at least a pair of compressed-air inlets formed therein and spaced from each other longitudinally of said conveyor means and being oppositely disposed, said air inlets being directed toward each other, a source of air under pressure connected to said air inlets, said housing having a material-discharge outlet, said air inlets and said material discharge outlet being arranged to simultaneously communicate with the individual compartments of said conveyor in succession as said conveyor moves along its path of conveyance whereby the material conveyed within the compartments will be discharged through said discharge outlet while said inlets and said discharge outlet so communicate, the air being directed through said air inlets constituting the sole means for fluidizing and conveying the material outwardly through said discharge outlet.

6. Apparatus for use in the transportation of pulverulent materials, said apparatus comprising a rotor, a housing surrounding said rotor and encasing at least a major portion thereof, a plurality of circumferentially spaced blades carried by said rotor and extending outwardly therefrom for rotation therewith within said housing, the outer portions of said blades passing in sufficient proximity to the interior surface of said housing to prevent any appreciable passage of air under pressure therebetween, said housing having a material-receiving opening formed therein adjacent said blades and adapted to be connected to a chamber holding pulverulent material and arranged to receive such material therefrom within said housing and between said blades to be engaged and carried thereby as they pass by said opening during rotation of said rotor, said housing having at least a pair of compressed-air inlets formed therein and spaced from each other, said air inlets being directed longitudinally of the axis of said rotor and adapted to be connected to a source of air under pressure and being arranged so as to introduce compressed air when so connected into the area between adjacent rotating blades at the same time, said housing having a discharge outlet communicating with said air inlets and arranged relative to said rotor and said air inlets to permit the pulverulent material mixed with the flow of such air through said inlets into the area between a pair of rotating adjacent blades to flow outwardly through said outlet, the air being directed into said air inlets constituting the sole means for fluidizing and conveying the material through said discharge outlet.

7. The structure defined in claim 6 wherein said discharge outlet is disposed between said air inlets.

8. The structure defined in claim 6 wherein said discharge outlet is directed tangentially relative to said rotor.

9. The structure defined in claim 6 wherein said discharge outlet is radial and is defined by radially outwardly extending portions of said housing.

10. Apparatus for use in the transportation of pulverulent materials, said apparatus comprising a driven rotor, a generally cylindrically shaped housing surrounding said rotor and encasing at least a major portion thereof, and having opposite ends, a plurality of circumferentially spaced blades carried by said rotor and extending outwardly therefrom for rotation therewith within said housing and defining material-carrying compartments therewith, the outer portions of said blades passing in sufficient proximity to the interior surface of said housing to prevent any appreciable passage of air under pressure therebetween, said housing having a material-receiving opening formed therein adapted to be connected to a chamber holding pulverulent material to admit such material within said housing and between said blades to be engaged and carried thereby as they pass by said opening during rotation of said rotor, said housing having a compressed-air inlet disposed at each of its opposite ends, each of said air inlets being directed longitudinally of the axis of rotation of said rotor and being adapted to be connected to a source of air under pressure and being arranged oppositely so as to introduce compressed air into opposite ends of said housing when so connected into the area between adjacent rotating blades at substantially the same time, said housing having a discharge outlet substantially radially aligned with said inlets relative to said rotor to permit the pulverulent material to pass outwardly therethrough after being mixed with the flow of such air through said housing inlets into the area between a pair of rotating adjacent blades, the air being directed into said air inlets constituting the sole means for fluidizing and conveying the material from said discharge outlet.

11. The structure defined in claim 10 wherein said discharge outlet is disposed between said air inlets.

12. The structure defined in claim 10 wherein said discharge outlet is directed tangentially relative to said rotor.

13. The structure defined in claim 10 wherein said discharge outlet is radial and is defined by radially outwardly extending portions of said housing.

14. The structure defined in claim 10 wherein said discharge outlet is disposed at one end of said housing and radially outwardly of the air inlet in said housing end.

15. The structure defined in claim 10 wherein said housing is constructed and arranged to provide a combined axial and radial discharge from said rotor.

16. The structure defined in claim 10 wherein said discharge opening is disposed within the radial confines of said rotor which are defined by said air inlets.

17. The structure defined in claim 10 wherein said air inlets are kidney-shaped and positioned so that each of said blades passes opposite one end portion thereof just prior to disengaging the inner wall of said housing.

18. Apparatus for use in the transportation of pulverulent material, said apparatus comprising a substantially sealed fluidizing chamber having a material-receiving inlet and having at least a pair of air inlets formed therein and spaced from each other, said air inlets being directed in different directions and connected to a source of air under pressure, and compartmentalized conveyor means movable within said chamber for movement of its compartments past said material inlet to receive material therefrom within its compartments and to convey the same away therefrom to a position between said air inlets, said chamber having a material discharge outlet communicating with said air inlets, means for moving said conveyor means for repeatedly introducing material into the confines of said chamber and into position therewithin between said air inlets and said discharge outlet, whereby the material introduced into said chamber will be fluidized by compressed air discharged from said air inlets and will be discharged through said discharge outlet, the air being directed into the chamber through said air inlets constituting the major means for fluidizing and conveying the material from said discharge outlet.

19. Apparatus for use in the transportation of pulverulent material, said apparatus comprising a substantially sealed fluidizing chamber having a material-receiving inlet and having a plurality of air inlets formed therein and spaced from each other and connected to a source of air under pressure, at least a pair of said air inlets being directed in different directions, and rotary compartmentalized conveyor means movable within said chamber for rotation of its compartments past said material inlet to receive material therefrom within its compartments and to convey to same away therefrom to a position between said air inlets, said air inlets being disposed within the orbit of the compartments of said conveyor means, said chamber having a material discharge outlet communicating with said air inlets, means for moving said conveyor means for repeatedly introducing material into the confines of said chamber and into position therewithin between said air inlets and said discharge outlet, whereby the material introduced into said chamber will be fluidized by compressed air discharged from said air inlets and will be discharged through said discharge outlet, the air being directed into the chamber through said air inlets constituting the major means for fluidizing and conveying the material from said discharge outlet.

References Cited in the file of this patent

UNITED STATES PATENTS

| | | |
|---|---|---|
| 2,115,023 | Kennedy | Apr. 26, 1938 |
| 2,681,748 | Weller | June 22, 1954 |
| 2,694,496 | Atkinson | Nov. 16, 1954 |
| 2,772,122 | Hall | Nov. 27, 1956 |
| 2,795,464 | Richards | June 11, 1957 |

FOREIGN PATENTS

| | | |
|---|---|---|
| 597,492 | Germany | May 25, 1934 |
| 609,842 | Germany | Jan. 31, 1935 |